(12) United States Patent
Pickard et al.

(10) Patent No.: US 9,337,925 B2
(45) Date of Patent: May 10, 2016

(54) APPARATUS AND METHODS FOR OPTICAL CONTROL OF LIGHTING DEVICES

(75) Inventors: Paul Kenneth Pickard, Morrisville, NC (US); Mike Harris, Cary, NC (US); Clinton Vilcans, Raleigh, NC (US)

(73) Assignee: Cree, Inc., Durham, NC (US)

( * ) Notice: Subject to any disclaimer, the term of this patent is extended or adjusted under 35 U.S.C. 154(b) by 1221 days.

(21) Appl. No.: 13/169,837

(22) Filed: Jun. 27, 2011

(65) Prior Publication Data

US 2012/0328299 A1    Dec. 27, 2012

(51) Int. Cl.
*H05B 33/08* (2006.01)
*H04B 10/116* (2013.01)

(52) U.S. Cl.
CPC .......... *H04B 10/116* (2013.01); *H05B 33/0824* (2013.01); *H05B 33/0857* (2013.01)

(58) Field of Classification Search
CPC ........... H05B 33/0869; H05B 33/0842; H05B 33/0857; H05B 33/086; H04B 10/116; H04B 10/603; H04B 10/80; H04B 10/807; H04B 10/808; H04B 10/01
USPC ............. 315/149, 150, 185 R, 188, 291, 294, 315/306, 308; 398/106, 115, 116, 212
See application file for complete search history.

(56) References Cited

U.S. PATENT DOCUMENTS

| 6,969,954 | B2 | 11/2005 | Lys |
| 7,777,166 | B2 | 8/2010 | Roberts |
| 7,926,300 | B2 | 4/2011 | Roberts et al. |
| 8,115,417 | B2 * | 2/2012 | Zhang et al. .................. 315/307 |
| 2007/0103007 | A1 * | 5/2007 | Miki ............................. 307/149 |
| 2007/0115228 | A1 | 5/2007 | Roberts et al. |
| 2008/0103714 | A1 * | 5/2008 | Aldrich et al. .................. 702/81 |
| 2008/0309255 | A1 | 12/2008 | Myers et al. |
| 2009/0160363 | A1 | 6/2009 | Negley et al. |
| 2010/0171430 | A1 * | 7/2010 | Seydoux ....................... 315/159 |
| 2010/0194721 | A1 * | 8/2010 | Miyata ................ G02F 1/13452 345/206 |
| 2011/0068696 | A1 | 3/2011 | van de Ven et al. |

(Continued)

FOREIGN PATENT DOCUMENTS

| CN | 1922932 A | 2/2007 |
| WO | WO 2011/008251 A2 | 1/2011 |
| WO | WO 2011008251 A2 * | 1/2011 |

OTHER PUBLICATIONS

Notification of Transmittal of the International Search Report and the Written Opinion of the International Searching Authority, or the Declaration, Corresponding to PCT Application No. PCT/US12/43131; Mailing Date Sep. 6, 2012; 14 pages.

(Continued)

*Primary Examiner* — Thai Pham
(74) *Attorney, Agent, or Firm* — Myers Bigel & Sibley, P.A.

(57) ABSTRACT

A lighting apparatus includes at least one light emitting device configured to receive an optical signal from a source external to the lighting apparatus and a control circuit coupled to the at least one light emitting device and configured to adjust a light output of the at least one light emitting device responsive to the received optical signal. The at least one light-emitting device may include at least one light-emitting diode (LED) configured to receive the optical signal, and the control circuit may include a detector circuit coupled to the at least one LED and configured to detect the received optical signal.

31 Claims, 9 Drawing Sheets

(56) References Cited

U.S. PATENT DOCUMENTS

2011/0068701 A1\* 3/2011 van de Ven et al. ....... 315/185 R
2011/0068702 A1 3/2011 van de Ven et al.
2012/0051757 A1\* 3/2012 Nishino et al. ................ 398/201

OTHER PUBLICATIONS

The LED Light.com; Energy Efficient Green Technology; *Remote Controlled 7 Color Changing LED Bulb* ;downloaded from www.theledlight.com/remote-controlled-ledbulb on May 5, 2011, 2 pages).

Clay Dillow; *The Light from Your Desk Lamp Could Carry Broadband Signals*, downloaded from www.popsci.com, downloaded Aug. 24, 2010, 3 pages.

Extended European Search Report corresponding to European Application No. 12805377.4, Dated Jan. 5, 2015, 6 pages.

Chinese First Office Action Corresponding to Chinese Patent Application No. 201280037650.2; Date of Notification: Apr. 24, 2015; Foreign Text, 16 Pages, English Translation Thereof, 8 Pages.

\* cited by examiner

Optical Signal

APPARATUS AND METHODS FOR OPTICAL CONTROL OF LIGHTING DEVICES

FIELD OF THE INVENTION

The present invention relates to lighting devices and, more particularly, to apparatus and methods for control of lighting apparatus.

BACKGROUND

Solid state lighting arrays are used for a number of lighting applications. For example, solid state lighting panels including arrays of solid state light emitting devices have been used as direct illumination sources, for example, in architectural and/or accent lighting. A solid state light emitting device may include, for example, a packaged light emitting device including one or more light emitting diodes (LEDs). The LEDs may include, for example, inorganic LEDs that include semiconductor layers forming p-n junctions and/or organic LEDs (OLEDs) that include organic light emission layers.

In illumination applications, it is often desirable to calibrate a lighting source such that it produces a particular color and/or intensity. It may also be desirable to calibrate a lighting source to respond in a particular manner to environmental control inputs, such as temperature, and user control inputs, such as dimming inputs.

One technique to tune the color point of a lighting fixture is described in commonly assigned United States Patent Publication No. 2009/0160363, the disclosure of which is incorporated herein by reference. The '363 application describes a system in which phosphor converted LEDs and red LEDs are combined to provide white light. The ratio of the various mixed colors of the LEDs is set at the time of manufacture by measuring the output of the light and then adjusting string currents to reach a desired color point. The current levels that achieve the desired color point are then fixed for the particular lighting device.

Some conventional lighting devices are calibrated, for example, using test fixtures designed to communicate with control circuits in lighting devices. Such a test fixture may be connected to a lighting device under test using a connector or other mechanical access port, such as contact pads designed to be contacted by "pogo pins" or similar conductors. Accordingly, providing a calibration capability in a lighting device can be cumbersome and incur additional cost.

SUMMARY

Some embodiments provide a lighting apparatus including at least one light emitting device configured to receive an optical signal from a source external to the lighting apparatus and a control circuit coupled to the at least one light emitting device and configured to adjust a light output of the at least one light emitting device responsive to the received optical signal. The at least one light-emitting device may include at least one light-emitting diode (LED) configured to receive the optical signal, and the control circuit may include a detector circuit coupled to the at least one LED and configured to detect the received optical signal.

In some embodiments, the at least one light-emitting device may include at least one string of serially-connected LEDs configured to receive the optical signal, and the detector circuit may be coupled to the string of serially-connected LEDs and configured to detect the received optical signal. In some embodiments, the at least one light-emitting device may include a plurality of strings of LEDs of respective different colors and the control circuit may include respective string control circuits configured to control respective ones of the strings of LEDs responsive to the detector circuit. In some embodiments, the at least one light-emitting device may include a string of LEDs of different colors. In further embodiments, the control circuit may include a bypass circuit configured to variably conduct a bypass current around the at least one light-emitting device responsive to the received optical signal.

According to some embodiments, the control circuit may be configured to adjust a lighting color and/or a lighting intensity produced by the apparatus responsive to the received optical signal. In some embodiments, the control circuit may be configured to adjust a control input response of the at least one light-emitting device responsive to the received optical signal. The control circuit may be configured adjust a temperature response and/or a dimming response of the at least one light-emitting device responsive to the received optical signal. In further embodiments, the control circuit may be further configured to inhibit further adjustment of the light output of the apparatus responsive to the received optical signal.

Additional embodiments provide a lighting apparatus including at least one light emitting device and a control circuit coupled to the at least one light emitting device and configured to adjust a control input response of the at least one light emitting device responsive to an optical signal from a source external to the lighting apparatus. For example, the control circuit may be configured to adjust a temperature response and/or a dimming response of the at least one light emitting device responsive to the optical signal.

Further embodiments provide a lighting apparatus including at least one light emitting device and a control circuit coupled to the at least one light emitting device and configured to calibrate an operating characteristic of the at least one light emitting device responsive to an optical calibration signal from a source external to the lighting apparatus.

Some embodiments provide a method of operating a lighting apparatus including at least one light emitting device. The method includes using the at least one light-emitting device to receive an optical signal from a source external to the lighting apparatus and adjusting a light output of the at least one light emitting device responsive to the received optical signal. Further embodiments provide a method that includes adjusting a control input response of the at least one light emitting device responsive to an optical signal from a source external to the lighting apparatus. Still further embodiments provide a method that includes calibrating an operating characteristic of the at least one light emitting device responsive to an optical calibration signal from a source external to the lighting apparatus.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS

Figure 1A:
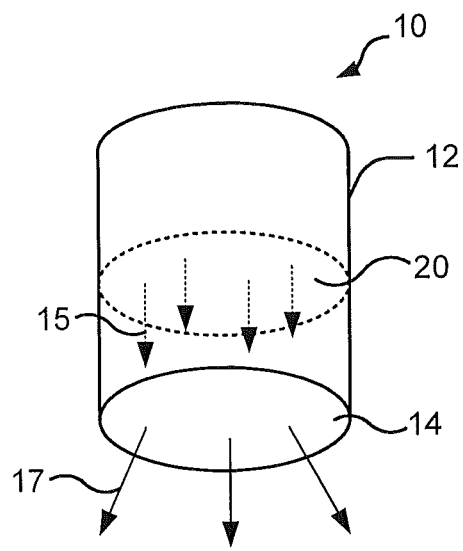
FIGS. 1A and 1B illustrate a solid state lighting apparatus in accordance with some embodiments of the inventive subject matter.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present inventive subject matter now will be described more fully hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The following description of some embodiments of the inventive subject matter refers to "light-emitting devices," which may include, but is not limited to, solid-state lighting devices, such as light emitting diode (LED) devices. As used herein, "LED" includes, but is not limited to, direct-emission devices that produce light when a voltage is applied across a PN junction thereof, as well as combinations of such direct-emission devices with luminescent materials, such as phosphors that emit visible-light radiation when excited by a source of radiation, such as a direct-emission device.

Embodiments of the present invention provide systems and methods for controlling solid state lighting devices and lighting apparatus incorporating such systems and/or methods. In some embodiments, the present invention can be utilized in connection with bypass circuits as described in co-pending and commonly assigned U.S. patent application Ser. No. 12/566,195 entitled "Solid State Lighting Apparatus with Controllable Bypass Circuits and Methods of Operating Thereof", co-pending and commonly assigned U.S. patent application Ser. No. 12/704,730 entitled "Solid State Lighting Apparatus with Compensation Bypass Circuits and Methods of Operation Thereof" and co-pending and commonly assigned U.S. patent application Ser. No. 12/566,142 entitled "Solid State Lighting Apparatus with Configurable Shunts", the disclosures of which are incorporated herein by reference.

Figure 1B:
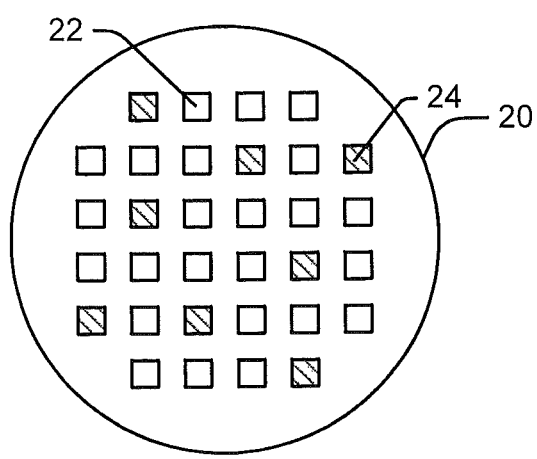

Referring to FIGS. 1A and 1B, a lighting apparatus 10 according to some embodiments is illustrated. The lighting apparatus 10 shown in FIGS. 1A and 1B is a "recessed downlight" or "can" lighting fixture that may be suitable for use in general illumination applications as a down light or spot light. However, it will be appreciated that a lighting apparatus according to some embodiments may have a different form factor. For example, a lighting apparatus according to some embodiments can have the shape of a conventional light bulb, a pan or tray light, an automotive headlamp, or any other suitable form.

The lighting apparatus 10 generally includes a can-shaped outer housing 12 in which a lighting panel 20 is arranged. In the embodiments illustrated in FIGS. 2A and 2B, the lighting panel 20 has a generally circular shape so as to fit within an interior of the cylindrical housing 12. Light is generated by solid state lighting devices (LEDs) 22, which are mounted on the lighting panel 20, and which are arranged to emit light 15 towards a diffusing lens 14 mounted at the end of the housing 12. Diffused light 17 is emitted through the lens 14. In some embodiments, the lens 14 may not diffuse the emitted light 15, but may redirect and/or focus the emitted light 15 in a desired near-field or far-field pattern. The LEDs 22 may include LEDs of different chromaticities that may be controlled to produce a desired intensity or color using various techniques discussed in detail below.

Figure 2:
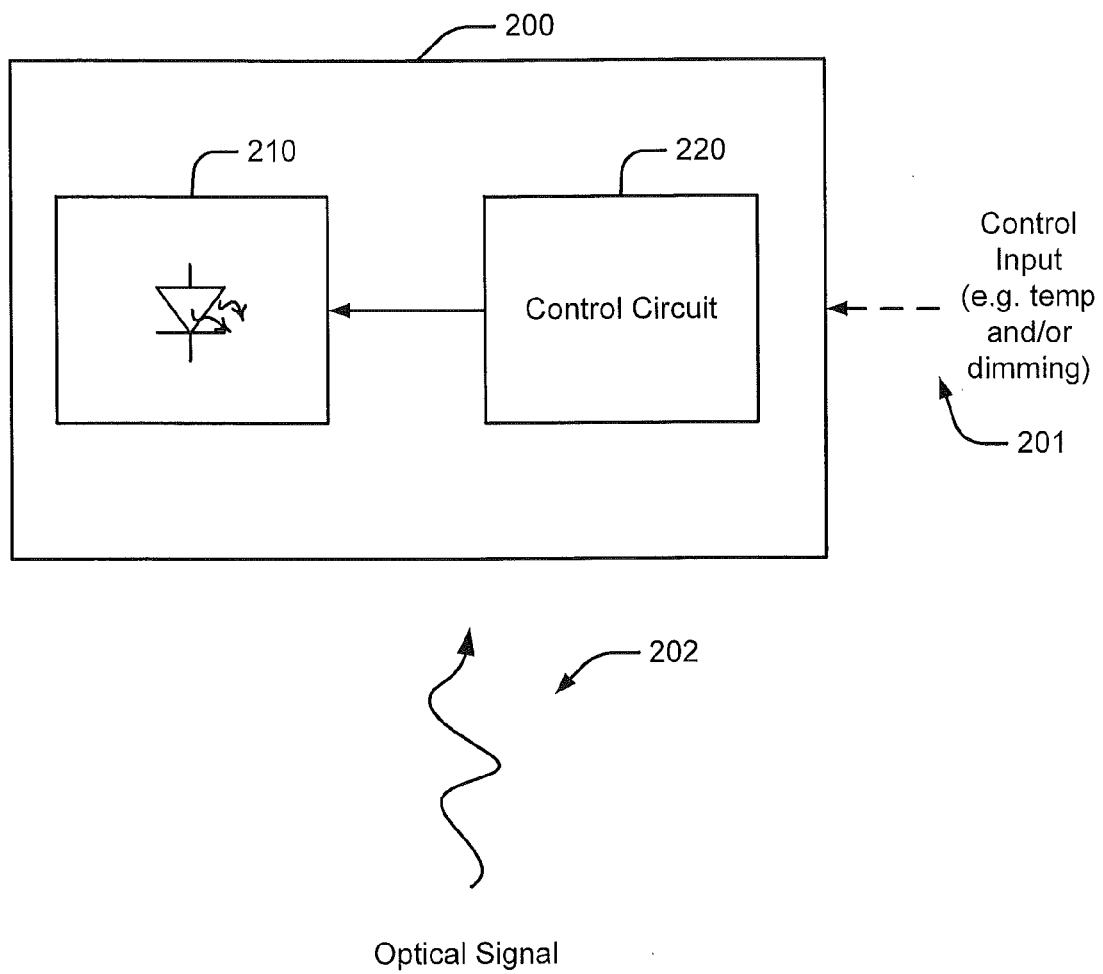
FIG. 2 is a schematic diagram illustrating a lighting apparatus with optical communications capability according to some embodiments of the inventive subject matter.

FIG. 2 illustrates a lighting apparatus 200 according to some embodiments. The apparatus 200 includes one or more light-emitting devices, here shown as one or more LEDs 210. The LEDs 210 are controlled by a control circuit 220, which may, for example, control an intensity and/or a color content of light produced by the one or more LEDs 210. As illustrated, the control circuit 220 may also control intensity, color and/or other characteristics responsive to one or more control inputs 201, such as temperature sensor inputs and/or dimming control inputs. The control circuit 220 may include, for example, analog circuitry, digital circuitry (e.g. a microprocessor or microcontroller) or a combination thereof.

As further shown, the apparatus 200 is further configured to receive an optical signal 202 and to adjust performance of the apparatus 200 responsive thereto. For example, in some embodiments, the optical signal 202 may be a calibration signal that causes the control circuit 220 to adjust a color point and/or intensity of light produced by the LEDs 210 responsive to the optical signal 202. In further embodiments, the optical signal 202 may be used to adjust a response of the control circuit 220 to the control input 201. For example, the optical signal 202 may be used to adjust a response to an environmental input, e.g., a temperature sensor signal, to provide a desired light output over a range of the environmental input. In some embodiments, the optical signal 202 may be used to adjust a response of the control circuit 220 to a user input, such as a dimming input, such that, for example, the lighting apparatus 200 provides a desired color temperature over a range of dimming control inputs.

In some embodiments, the apparatus 200 may include a dedicated optical receiver, such as an infrared (IR) receiver along the lines of the TSOP 36230 IR receiver produced by Vishay Intertechnology, may be used to receive the optical signal 202. According to further embodiments described below, the LEDs 210 themselves may serve as part of an optical receiver that receives the optical signal 202, such that the need for a special optical receiver may be eliminated.

In some embodiments, the apparatus 200 may be configured to be calibrated responsive to the optical signal 202. For example, during production testing and calibration of the apparatus 200, the optical signal 202 may be used to calibrate performance of the apparatus 200 without requiring special connectors. Parameters may be set at the factory using, for example, a modulated optical signal. Calibration may be completed by transmitting a "lock" code that inhibits further adjustment after the device is shipped.

Figure 3:
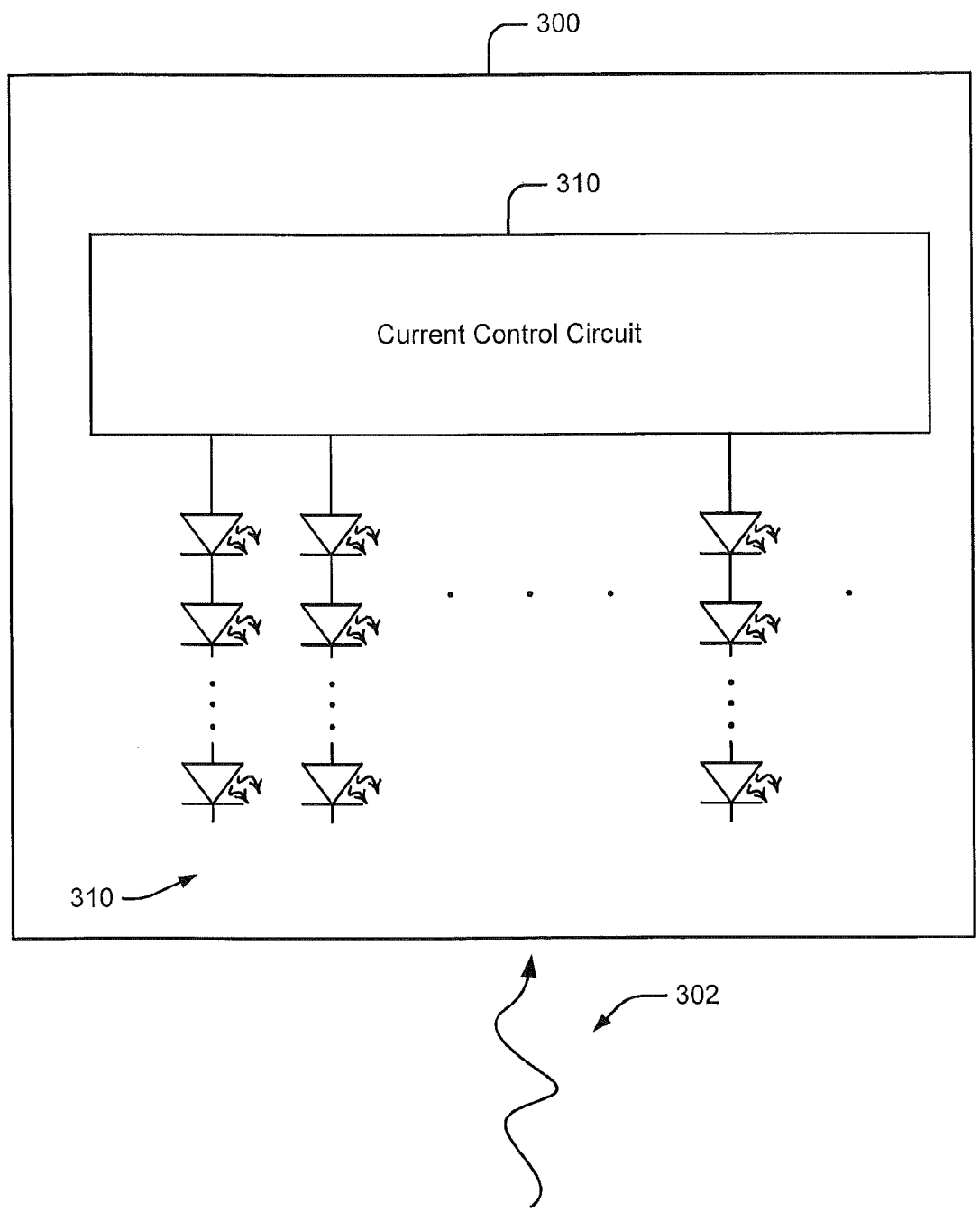
FIG. 3 is a schematic diagram illustrating an optically calibrated lighting apparatus including one or more strings of serially-connected LEDs according to some embodiments of the inventive subject matter.

An optical signal along the lines described above may be used to calibrate a variety of different types of lighting apparatus. For example, FIG. 3 illustrates a lighting apparatus 300 including one or more strings 310 of serially-connected LEDs. The one or more strings 310 of LEDs may be coupled to a current control circuit 320 that controls currents supplied to respective ones of the strings 310. As illustrated, the current control circuit 320 may act as a current source for the strings 310, but it will be appreciated that, in some embodiments, a current control circuit may operate as a controllable current sink for one or more strings of LEDs. The strings 310 may, for example, include LEDs of different colors, the output of which may be combined to produce an aggregate output with a white or other desired color. The current control circuit 320 may be configured to provide different currents to the respective strings to provide a desired output. As further illustrated, the current control circuit 320 may be calibrated or otherwise adjusted using an optical signal 302. For example, the optical signal 302 may be used to calibrate a color point of the apparatus 300 and/or to adjust a temperature response and/or a dimming response thereof.

Figure 4:
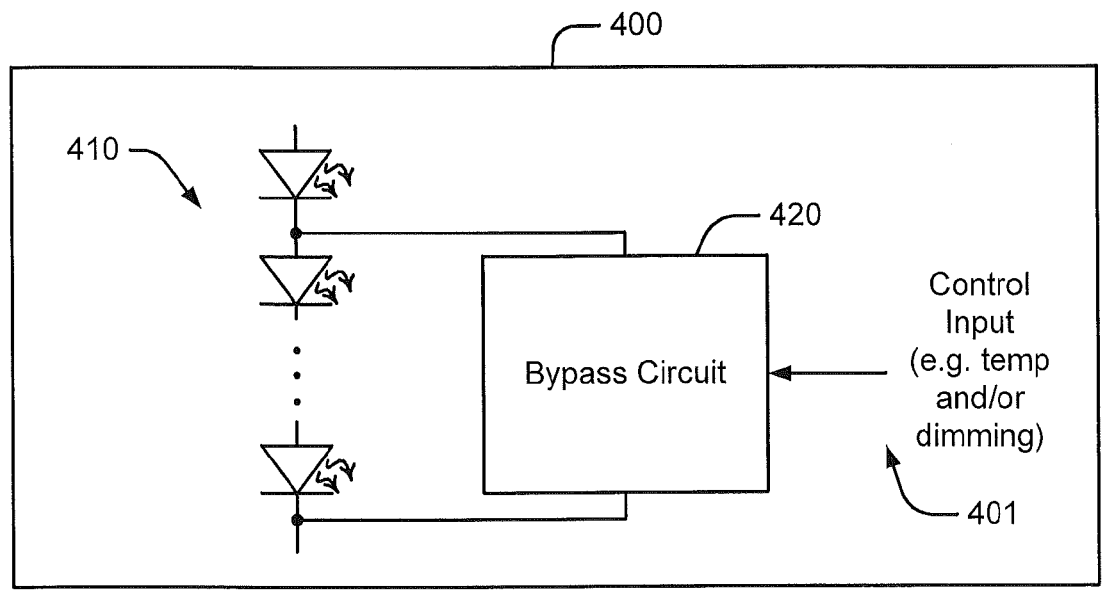
FIG. 4 is a schematic diagram illustrating an optically calibrated lighting apparatus with a controllable bypass circuit according to further embodiments of the inventive subject matter.
Figure 4:
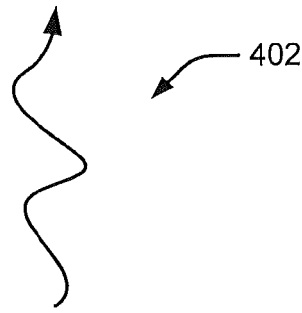

As illustrated in FIG. 4, a lighting apparatus 400 according to further embodiments may include a string 410 of serially-connected LEDs and one or more bypass circuits 420 that are configured to bypass current around one or more of the LEDs in the string 410. Such a bypass circuit 420 may be controllable responsive to a control input, such as a temperature sense signal or a dimming signal along lines described, for example, in the aforementioned U.S. patent application Ser. No. 12/566,195 entitled "Solid State Lighting Apparatus with Controllable Bypass Circuits and Methods of Operating Thereof" and U.S. patent application Ser. No. 12/704,730 entitled "Solid State Lighting Apparatus with Compensation Bypass Circuits and Methods of Operation Thereof". As further illustrated, operating characteristics of the bypass circuit 420 may be varied responsive to an optical signal 402.

Figure 5:
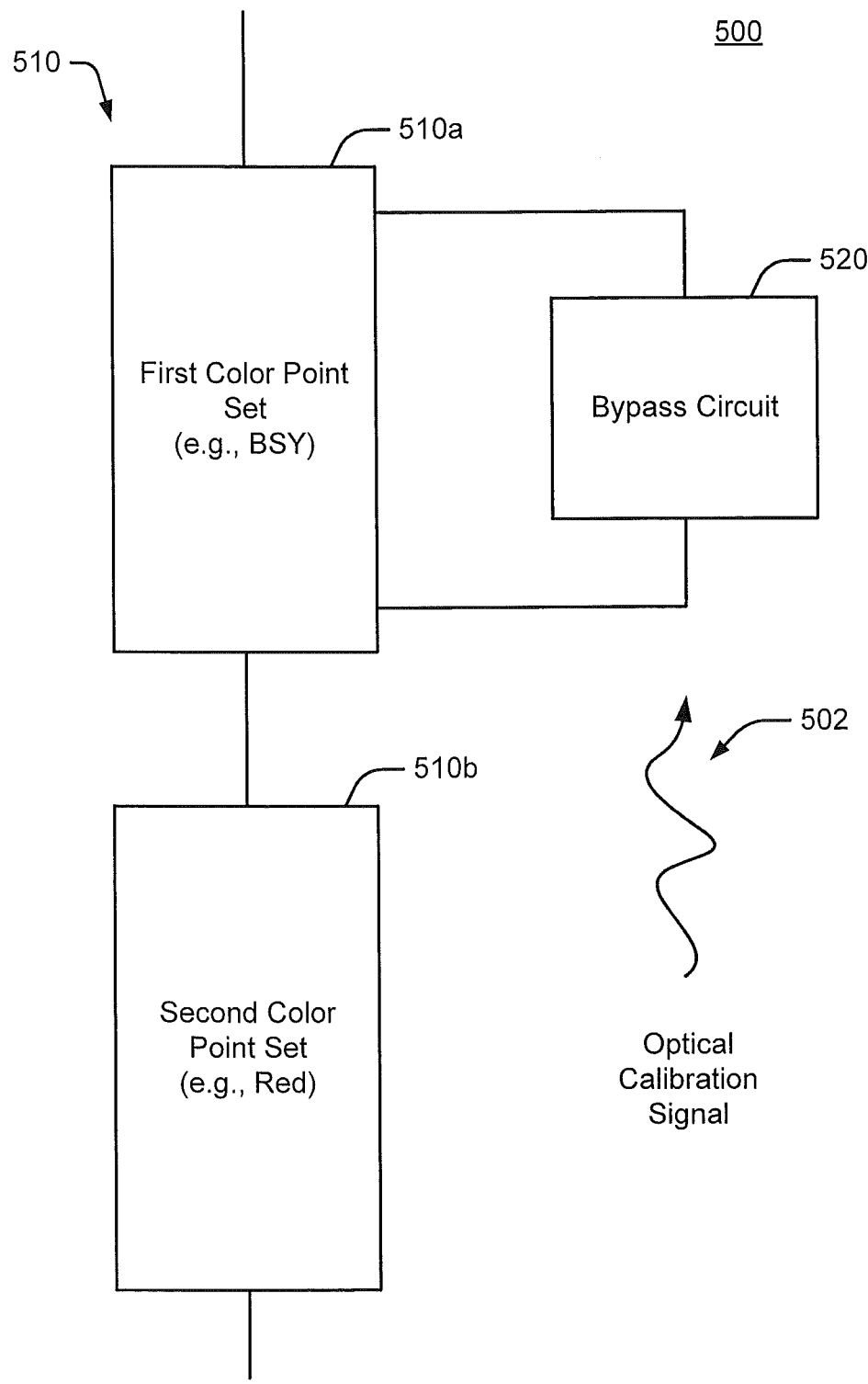
FIG. 5 is a schematic diagram illustrating a lighting apparatus configured to use an optically calibrated controllable bypass circuit for color point control according to some embodiments of the inventive subject matter.
Figure 6:
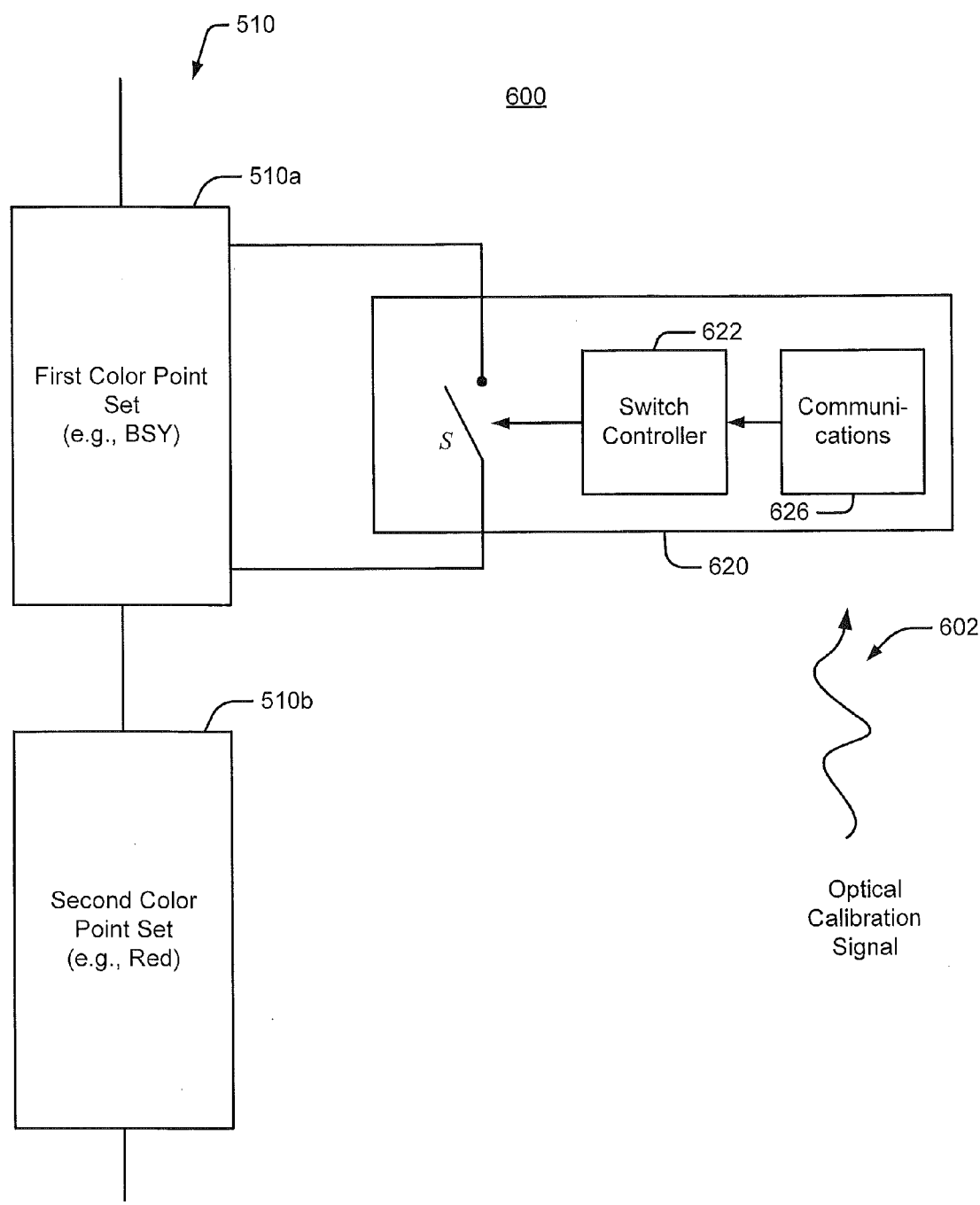
FIG. 6 is a schematic diagram illustrating a lighting apparatus with an optical communications circuit and a controllable bypass circuit for color point control according to further embodiments of the inventive subject matter.

For example, as illustrated in FIG. 5, a lighting apparatus 500 may include a string 510 of LEDs with one or more LEDs 510a having a first color point (e.g., blue-shifted yellow (BSY)) and one or more LEDs 510b having a second color point (e.g., red). A controllable bypass circuit 520 may selectively bypass current around the first LED's 510a responsive to a temperature signal such that, for example, the apparatus 500 produces a desired color over a range of temperatures. An optical signal 502 may be used to calibrate the bypass circuit 520 to provide a desired color behavior. FIG. 6 illustrates an exemplary implementation in which a bypass circuit 620 includes an optical communications circuit 626 that provides calibration information to a switch control circuit 622 that operates a bypass switch S. The calibration information may be provided responsive to an optical calibration signal 602.

Figure 7:
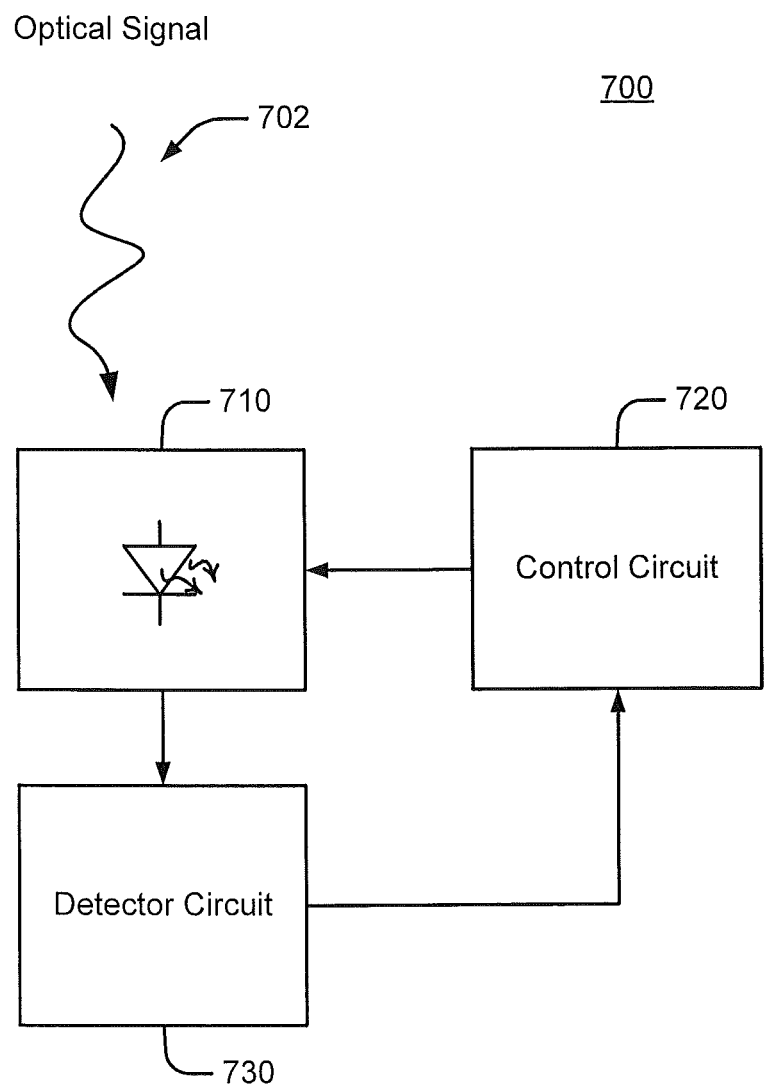
FIG. 7 is a schematic diagram illustrating a lighting apparatus using LEDs for illumination and communication according to some embodiments of the inventive subject matter.

According to further embodiments, an optical signal, such as an optical calibration signal, may be received by the same LEDs that are used to provide illumination in a lighting apparatus. Referring to FIG. 7, a lighting apparatus 700 may include one or more LEDs 710 that are configured to produce light under control of a control circuit 720. The apparatus 700 may include a detector circuit 730 coupled to the one or more LEDs 710. The detector circuit 730 may be configured to detect an optical signal 702 incident upon the LEDs 710. The detector circuit 730 may be coupled to the control circuit 720 and may convey calibration information in the optical signal 702 to the control circuit 720. In further embodiments, control information may be conveyed to the control circuit 720 in the same manner to implement functions other than calibration, such as to command certain behavior by the apparatus 700, such as, for example, a desired color, intensity or other effect. It will be appreciated that such dual use of LEDs for illumination and communication may be employed with a variety of different types of lighting circuits including, but not limited to, the configurations described above with reference to FIGS. 3-6.

Figure 8:
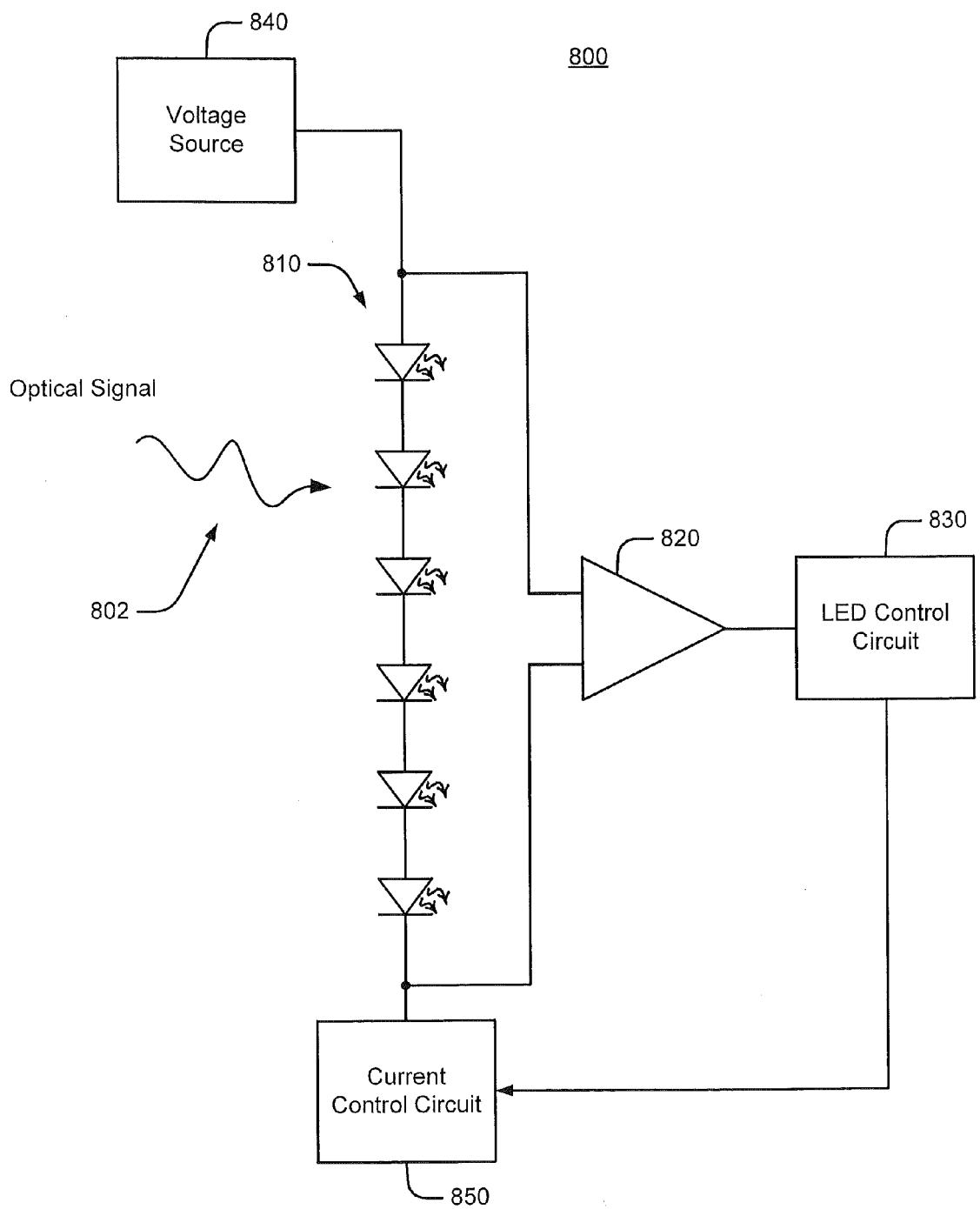
FIG. 8 is a schematic diagram illustrating a lighting apparatus using LEDs for illumination and communication according to further embodiments of the inventive subject matter.

FIG. 8 illustrates an example of a lighting apparatus 800 using LEDs for illumination and communication. A lighting apparatus 800 including a string 810 of serially-connected LEDs, coupled to a voltage source 840 and a current control circuit 850. The voltage source 840 may include, for example, a rectifier that is configured to be coupled to an AC line and that provides a DC output to the string 810. The current control circuit 850 may be, for example, a linear or switch mode power supply configured to control current passing through the string 810. The current control circuit 850 may be controlled by an LED control circuit 830, for example, a microprocessor-based circuit that provides drive signals to transistors or other current modulating devices in the current control circuit 850. Additional LED control circuitry, such as bypass circuitry, may also be present. For example, the optical signal 802 may be a pulsed signal, the modulation of which conveys calibration and/or other control information.

As further illustrated, the LED string 810 may be configured to receive an incident optical signal 802. The apparatus 800 may include an amplifier circuit 820 that is configured to detect the optical signal 802 by, for example, sensing a voltage across at least some of the LEDs of the string 810 that arise from currents generated by the incident optical signal 802. The optical signal 802 may be at a wavelength that differs from the wavelengths emitted by the LED string 810. The information in the detected signal may be used by the LED control circuit 830 for calibration or other purposes along the lines discussed above.

Figure 9:
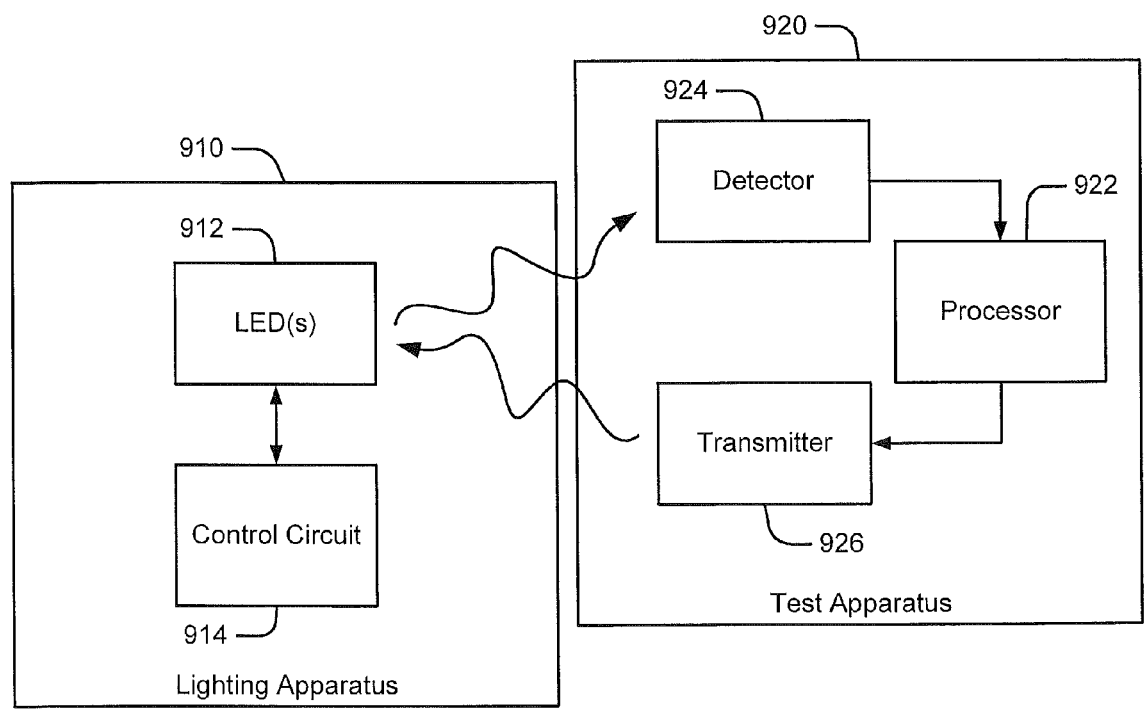
FIG. 9 is a schematic diagram illustrating apparatus and operations for calibrating a lighting apparatus according to some embodiments of the inventive subject matter.

FIG. 9 illustrates operations and apparatus for calibrating a lighting apparatus 910 according to some embodiments. The lighting apparatus 910 includes one or more LEDs 912 and a control circuit 914 configured to control the LEDs 912. A test apparatus 920 includes a detector 924 configured to detect light produced by the lighting apparatus 910 to and to provide an output signal indicative of the detected light to a control processor 922. Responsive to this information, the control processor 822 may cause an optical transmitter 926 to generate an optical calibration signal, which may be received by the LEDs 912 or by a separate optical receiver in the lighting apparatus 910. The control circuit 914 may be configured to adjust the lighting apparatus 910 responsive to the optical calibration signal.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A lighting apparatus comprising:
  at least one light-emitting diode (LED) configured to receive an optical signal transmitted from a source external to the lighting apparatus; and
  a control circuit coupled to the at least one LED and configured to inhibit adjustment of a parameter that controls a characteristic of light produced by the at least one LED responsive to a lock command received from the external source of the transmitted optical signal.

2. The lighting apparatus of claim 1, wherein the at least one LED comprises at least one string of serially-connected LEDs configured to receive the optical signal and wherein the control circuit is coupled to the string of serially-connected LEDs and configured to detect the received optical signal.

3. The lighting apparatus of claim 2, wherein the at least one LED comprises a plurality of strings of LEDs of respective different colors and wherein the control circuit comprises respective string control circuits configured to control respective ones of the strings of LEDs.

4. The lighting apparatus of claim 2, wherein the at least one LED comprises a string of LEDs of different colors.

5. The lighting apparatus of claim 1, wherein the control circuit comprises a bypass circuit configured to variably conduct a bypass current around the at least one LED responsive to the received optical signal, before inhibiting the adjustment.

6. The lighting apparatus of claim 1, wherein the control circuit is configured to adjust at least one of a lighting color and a lighting intensity produced by the lighting apparatus responsive to the received optical signal, before inhibiting the adjustment.

7. The lighting apparatus of claim 1, wherein the control circuit is configured to adjust a control input response of the lighting apparatus responsive to the received optical signal, before inhibiting the adjustment.

8. The lighting apparatus of claim 7, wherein the control circuit is configured to adjust at least one of a temperature response and a dimming response of the lighting apparatus responsive to the received optical signal, before inhibiting the adjustment.

9. The lighting apparatus of claim 1, wherein the optical signal comprises a pulsed optical signal.

10. The lighting apparatus of claim 1, wherein the parameter comprises a factory-set parameter.

11. The lighting apparatus of claim 1, wherein the optical signal comprises the lock command.

12. A lighting apparatus comprising:
  at least one LED configured to receive an optical signal transmitted from a source external to the lighting apparatus; and
  a control circuit coupled to the at least one LED and configured to:
    cause the at least one LED to produce light;
    adjust a control input response of the lighting apparatus responsive to the received optical signal; and
    inhibit further adjustment of the control input response, and inhibit adjustment of any other parameter that controls a characteristic of the light produced by the at least one LED, responsive to a lock command received from the external source of the transmitted optical signal.

13. The lighting apparatus of claim 12, wherein the control circuit is configured to adjust at least one of a temperature response and a dimming response of the lighting apparatus responsive to the received optical signal, before inhibiting the adjustment.

14. The lighting apparatus of claim 12, wherein the control circuit comprises a bypass circuit configured to variably conduct a bypass current around the at least one LED responsive to the received optical signal, before inhibiting the adjustment.

15. The lighting apparatus of claim 12, wherein the control circuit is configured to adjust at least one of a lighting color and a lighting intensity produced by the lighting apparatus responsive to the received optical signal, before inhibiting the adjustment.

16. A lighting apparatus comprising:
  at least one LED configured to receive an optical calibration signal transmitted from a source external to the lighting apparatus; and
  a control circuit coupled to the at least one LED and configured to:
    cause the at least one LED to produce light;
    calibrate an operating characteristic of the lighting apparatus responsive to the received optical calibration signal; and
    inhibit further adjustment of the operating characteristic responsive to a lock command received from the external source of the transmitted optical calibration signal.

17. The lighting apparatus of claim 16, wherein the control circuit is configured to adjust a control input response of the lighting apparatus responsive to the received optical calibration signal, before inhibiting the adjustment.

18. The lighting apparatus of claim 16, wherein the control circuit is configured to adjust at least one of a color and an intensity of light produced by the lighting apparatus responsive to the received optical calibration signal, before inhibiting the adjustment.

19. The lighting apparatus of claim 16, wherein the control circuit comprises a bypass circuit configured to variably conduct a bypass current around the at least one LED responsive to the received optical calibration signal, before inhibiting the adjustment.

20. A method of operating a lighting apparatus, the method comprising:
using at least one LED of the lighting apparatus to receive an optical signal transmitted from a source external to the lighting apparatus; and
inhibiting adjustment of a parameter that controls a characteristic of light produced by the at least one LED responsive to a lock command received from the external source of the transmitted optical signal.

21. The method of claim 20, further comprising adjusting the light produced by the at least one LED by variably conducting a bypass current around the at least one LED responsive to the received optical signal, before inhibiting the adjustment.

22. The method of claim 20, further comprising adjusting the light produced by the at least one LED by adjusting at least one of a lighting color and a lighting intensity produced by the lighting apparatus responsive to the received optical signal, before inhibiting the adjustment.

23. The method of claim 20, further comprising adjusting the light produced by the at least one LED by adjusting a control input response of the lighting apparatus responsive to the received optical signal, before inhibiting the adjustment.

24. The method of claim 20,
wherein using the at least one LED of the lighting apparatus to receive the optical signal comprises using the at least one LED of the lighting apparatus to receive a pulsed optical signal from the source external to the lighting apparatus, and
wherein the method further comprises adjusting the light produced by the at least one LED responsive to the pulsed optical signal, before inhibiting the adjustment.

25. The method of claim 20, wherein inhibiting the adjustment of the parameter comprises inhibiting adjustment of a factory-set parameter that controls the characteristic of the light produced by the at least one LED, responsive to the lock command.

26. The method of claim 20, wherein inhibiting the adjustment of the parameter comprises permanently fixing the parameter that controls the characteristic of the light produced by the at least one LED, responsive to the lock command.

27. A method of operating a lighting apparatus, the method comprising:
receiving an optical signal transmitted from a source external to the lighting apparatus using at least one LED of the lighting apparatus;
adjusting a control input response of the lighting apparatus responsive to the received optical signal;
inhibiting further adjustment of the control input response, and inhibiting adjustment of any other parameter that controls a characteristic of light generated by the at least one LED, responsive to a lock command received from the external source of the transmitted optical signal; and
generating the light from the at least one LED.

28. The method of claim 27, wherein adjusting a control input response of the lighting apparatus responsive to the received optical signal comprises adjusting at least one of a temperature response and a dimming response of the lighting apparatus responsive to the optical signal, before inhibiting the adjustment.

29. A method of operating a lighting apparatus, the method comprising:
calibrating an operating characteristic of the lighting apparatus responsive to an optical calibration signal received by at least one LED of the lighting apparatus and transmitted from a source external to the lighting apparatus;
inhibiting further calibration of the operating characteristic responsive to a lock command received from the external source of the transmitted optical calibration signal; and
generating light from the at least one LED.

30. The method of claim 29, wherein calibrating an operating characteristic of the lighting apparatus responsive to an optical calibration signal received by at least one LED of the lighting apparatus from a source external to the lighting apparatus comprises adjusting a control input response of the lighting apparatus responsive to the optical calibration signal.

31. The method of claim 29, wherein calibrating an operating characteristic of the lighting apparatus responsive to an optical calibration signal received by at least one LED of the lighting apparatus from a source external to the lighting apparatus comprises adjusting at least one of a color and an intensity of light produced by the lighting apparatus responsive to the optical calibration signal.

* * * * *